(12) United States Patent
Wikle et al.

(10) Patent No.: US 6,202,136 B1
(45) Date of Patent: *Mar. 13, 2001

(54) METHOD OF CREATING AN INTERNALLY CONSISTENT COPY OF AN ACTIVELY UPDATED DATA SET WITHOUT SPECIALIZED CACHING HARDWARE

(75) Inventors: Shawn B. Wikle; William R. Cunningham; Carla C. Birk; Linda S. Ball, all of Austin, TX (US)

(73) Assignee: BMC Software, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/807,313

(22) Filed: Feb. 27, 1997

Related U.S. Application Data

(63) Continuation of application No. 08/356,479, filed on Dec. 15, 1994, now abandoned.

(51) Int. Cl.[7] .................................................... G06F 12/16
(52) U.S. Cl. ............................................................. 711/162
(58) Field of Search ................................... 395/488, 489; 711/161, 162

(56) References Cited

U.S. PATENT DOCUMENTS

| | | | |
|---|---|---|---|
| 5,163,148 | * | 11/1992 | Walls .................................... 395/600 |
| 5,241,670 | * | 8/1993 | Eastridge et al. ..................... 395/180 |
| 5,375,232 | * | 12/1994 | Legvold et al. ....................... 395/489 |
| 5,487,160 | * | 1/1996 | Bemis .................................... 395/441 |
| 5,535,381 | * | 7/1996 | Kopper .................................. 395/600 |
| 5,546,534 | * | 8/1996 | Malcolm ........................... 395/182.04 |

OTHER PUBLICATIONS

GNU source code for 'cp' file copying utility.*

* cited by examiner

*Primary Examiner*—Kevin L. Ellis
(74) *Attorney, Agent, or Firm*—Howrey, Simon, Arnold & White

(57) ABSTRACT

A computer program operating in accordance with the invention monitors WRITE requests issued by a data-writing program that accesses data sets, e.g., for updating the data sets, and READ requests issued by a data-reading program that accesses data sets, e.g., for copying the data. While a series of READ requests (e.g., a data set copying operation) is in progress, the computer program monitors all WRITE requests issued for the data set in question by the data-writing program. If the data-reading program has not yet read the data portion (e.g., a data page) that is to be updated, the computer program selectively creates a cached image of the data portion as it existed at the beginning of the series of READ requests and delivers the cached image to the data-reading program, thereby reducing the potential for internal inconsistencies in the copied data. The computer program advantageously permits such caching to be performed without the need for specialized caching hardware.

2 Claims, 19 Drawing Sheets

Before XBM is Installed

Media Management Vector Table (MMVT)

1001

After XBM is Installed

Media Management Vector Table (MMVT)

1003

Data Page Before
(on disk)
1601

Data Page in Cache
(compressed)
1611

Data Page supplied to
Application (expanded
1613

METHOD OF CREATING AN INTERNALLY CONSISTENT COPY OF AN ACTIVELY UPDATED DATA SET WITHOUT SPECIALIZED CACHING HARDWARE

This application is a file wrapper continuation application of Ser. No. 08/356,479, filed Dec. 15, 1994, now abandoned.

BACKGROUND OF THE INVENTION

This invention relates to a method of creating an internally consistent copy of an actively updated data set using processor memory. The invention advantageously permits a user to utilize both a computer program that requires access to the data set (e.g., a database report generator, a copy utility, or other such program) and a different computer program that might update the data set (e.g., a database management system program) while maintaining internal consistency in the data set, without the need for specialized caching hardware.

The general context of the operations associated with the invention is illustrated in FIG. 1. Quite commonly, a computer system administrator or other user will wish to create an image copy of a data set, e.g., a data set 102 comprising one or more data pages labeled as 1, 2, and 3, that are stored in a storage device 100 such as a direct access storage device (DASD). Typical copy programs accomplish this by creating an image copy of the data pages 1, 2, 3 in one or more buffers 105 and eventually writing out the image copy to another storage device 110 such as a magnetic tape, another DASD, and so forth.

During the copying sequence, the data set 102 represented by data pages 1, 2, 3 may be accessible to WRITE-type operations from another computer program such as the well-known IBM database program DB2 (not shown). The DB2 program may attempt, for example, to overwrite a data page 2 with data from a DB2 buffer pool 115 in parallel with the copying process. Under this sequence of events, if the updating takes place before the data page 2 is copied to the buffer 105, the version of the data page 2 that is actually copied is not the same as the version that existed when the copy process was initiated. As a result, the data page 2 as copied to the buffer 105 may be internally inconsistent with associated data page 1 and/or data page 3, possibly violating logical data consistency constraints (e.g., referential integrity constraints) within the data set.

SUMMARY OF THE INVENTION

A computer program operating in accordance with the invention monitors WRITE requests issued by a data-writing program that accesses data sets, e.g., for updating the data sets, and also monitors READ requests issued by a data-reading program that accesses data sets, e.g., for copying the data. While a series of READ requests (e.g., a data set copying operation) is in progress, the computer program monitors all WRITE requests issued for the relavent data set by the data-writing program. If the data-reading program has not yet read the data portion (e.g., a data page) that is to be updated, the computer program selectively creates a cached image of the data portion as it existed at the beginning of the series of READ requests and delivers the cached image to the data-reading program. Delivering the cached image reduces the potential for internal inconsistencies in the copied data. The computer program advantageously permits such caching to be performed without the need for specialized caching hardware.

DETAILED DESCRIPTION OF SPECIFIC EMBODIMENTS

One implementation of the invention is described here for purposes of illustration, namely a machine-executed method of controlling a DB2 updating program in combination with a copy program that sequentially reads an MVS data set. The machine-executed method is performed by a computer program referred to, for purposes of convenience, as XBM, an acronym for eXtended Buffer Manager, the name of a commercial product in which the implementation has been implemented by the assignee. The copy program in the illustrative implementation is referred to, for purposes of convenience, as COPY PLUS, again using the name of a commercial product distributed by the assignee. An actual implementation of such a program might be executable on, e.g., an IBM System 370-compatible machine or equivalent running IBM OS/VS SP2 (MVS/XA), SP3 or SP4 (MVS/ESA), or on one or more other suitable computer systems.

(It will be appreciated by those of ordinary skill, of course, that all references to the performance of method steps by a computer program actually mean that a computer is performing the method steps in response to the instructions encoded in the computer program.)

In the interest of clarity, not all features of an actual implementation are described in this specification. It will of course be appreciated that in the development of any such actual implementation (as in any software development project), numerous programming decisions must be made to achieve the developers' specific goals and subgoals (e.g., compliance with system- and business-related constraints), which will vary from one implementation to another. Moreover, attention will necessarily be paid to, e.g., proper serialization to handle concurrent events. It will be appreciated that such a development effort might be complex and time-consuming, but would nevertheless be a routine undertaking of MVS system program development for those of ordinary skill having the benefit of this disclosure.

Figure 1:
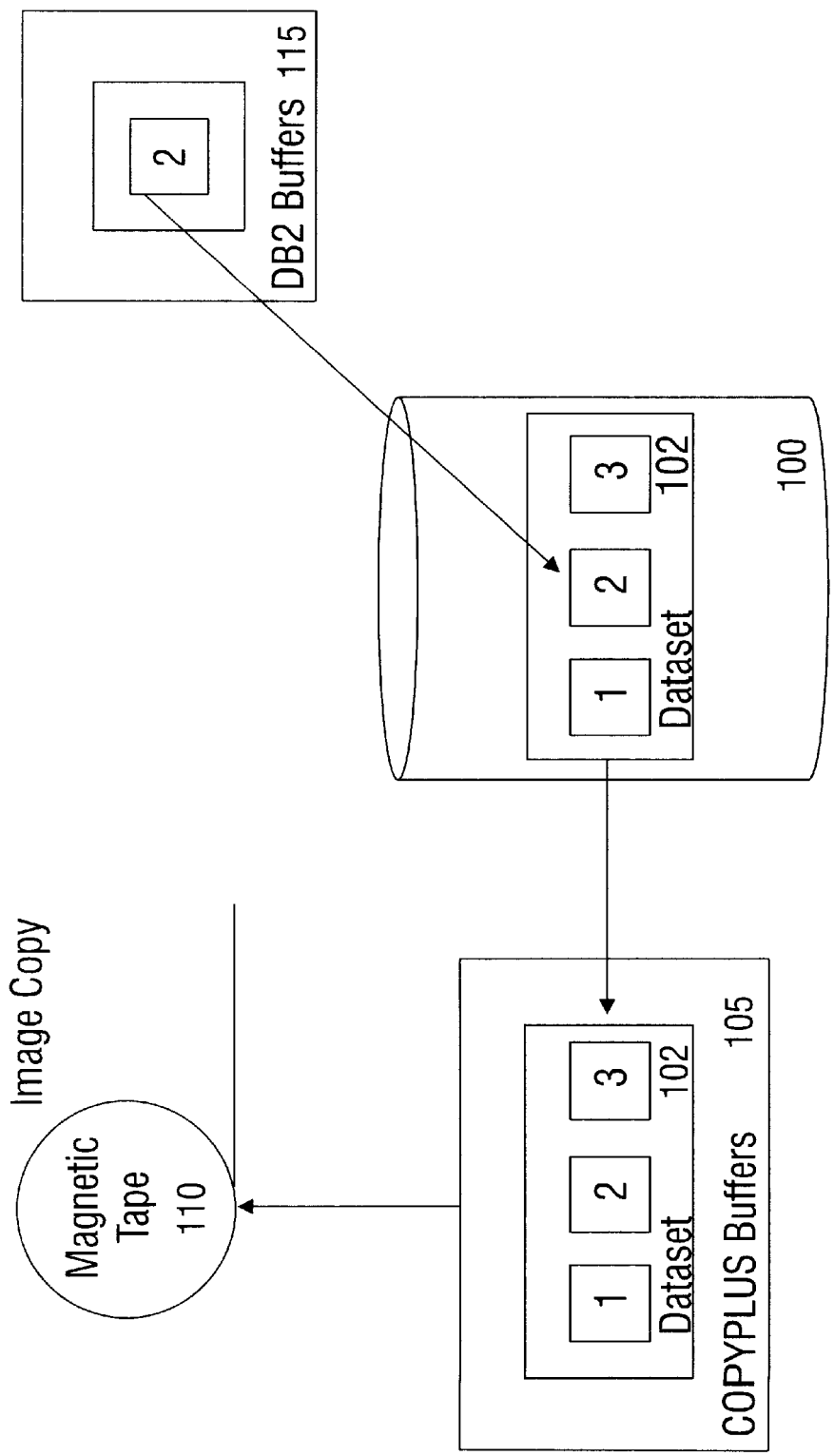
FIG. 1 is a block-diagram view of a typical data copying operation as found in the prior art.
Figure 2:
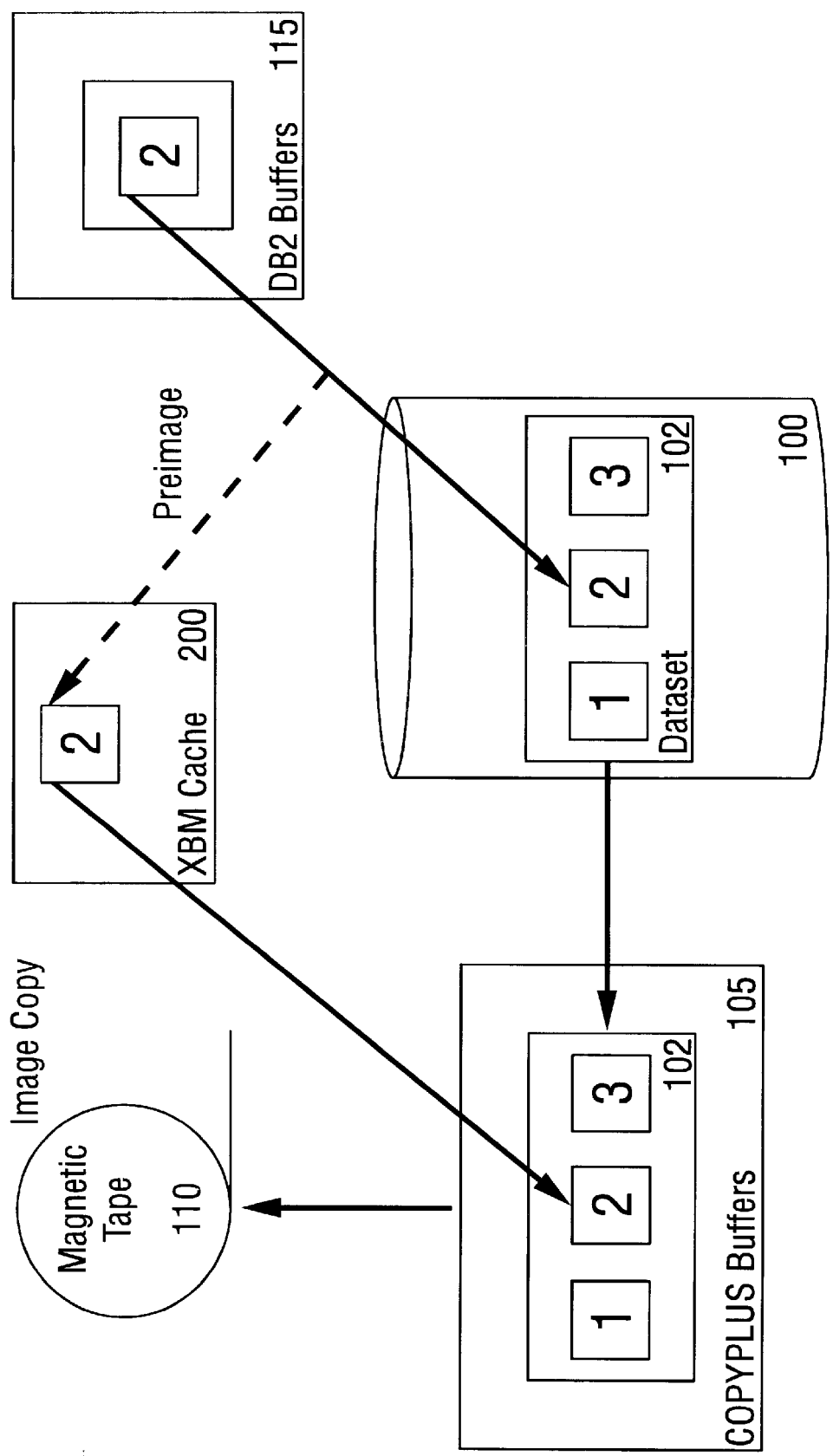
FIG. 2 is a similar view of such an operation in conjunction with an illustrative method in accordance with the invention.
Figure 3:
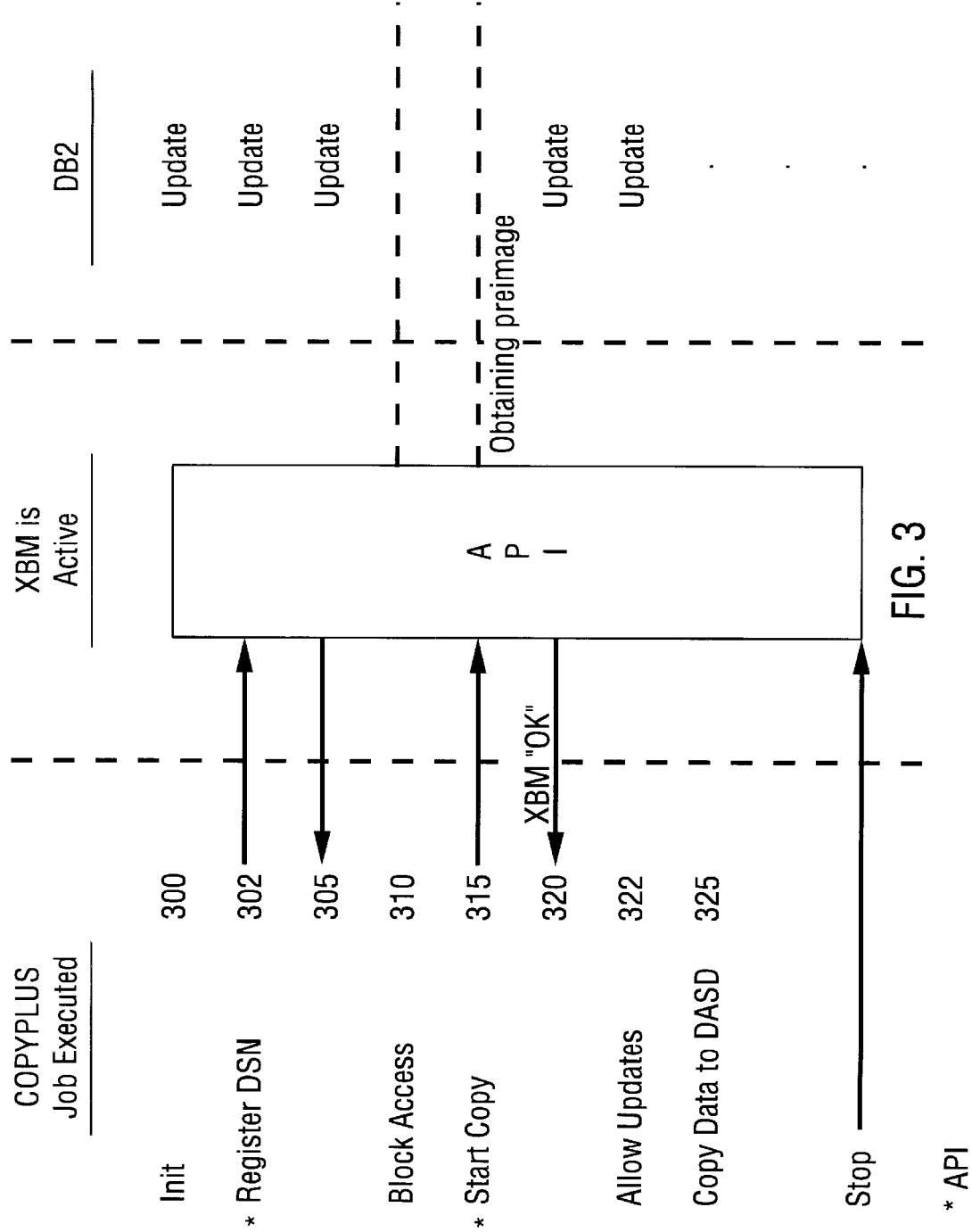
FIG. 3 is a time-line flow diagram overview of steps performed in such a method.

Referring to FIG. 3, at step 300 the COPY PLUS program acquires working storage and performs other routine initialization chores.

Step 302: COPY PLUS generates an XBM registration signal and transmits it to XBM. The XBM registration signal signifies that COPY PLUS intends to copy data from a data set 102 in the near future and that XBM should create "snapshot" caches of the data set if the data set is updated during the copying process. (The data set in question is sometimes referred to below as a snapshot data set.) The XBM registration signal may be generated by COPY PLUS in the form of a call to an application program interface (API) that permits communications to be exchanged between XBM and other computer programs. The use of APIs for communications between computer programs is well known in the art and therefore is not further described here.

Step 305: If the XBM registration signal conforms to the API, and if XBM determines that caching is possible (given the then-existing state of the computer system), then XBM responds with a signal to COPY PLUS that it can support such an operation.

Step 310: COPY PLUS issues a DB2 command to block access to the data set 102. One such command is START DATABASE [NAME] SPACENAM [NAME] ACCESS (RO) call followed by a QUIESCE call; another is a LOCK TABLE call followed by a QUIESCE call. Either approach has the effect of ensuring that all DB2 updates to the data set 102 that are pending in the buffer pool 115 are written out to the DASD, and then, of freezing any DB2 attempts to update the data set 102.

Step 315: COPY PLUS issues a start-copy signal to XBM, via the XBM API, signifying that COPY PLUS is about to begin copying the data set 102.

(If so specified by the user, COPY PLUS can issue XBM registration signals and start-copy signals for multiple data sets to establish consistency across data sets. XBM then concurrently monitors the updating and copying of each data set as described below.)

Step 320: XBM signals (in effect) "OK" to COPY PLUS. That means that any subsequent attempts by DB2 to update the data set 102 will be intercepted and cached as discussed below.

Step 322: COPY PLUS issues a DB2 command to allow update access to the data set 102, e.g., a START DATABASE [NAME] SPACENAM [NAME] ACCESS (RW) call or a COMMIT call.

Step 325: COPY PLUS begins copying the data set 102 by issuing a series of one or more READ commands to read the data pages 1, 2, 3 into the buffer 105.

Figure 4A:
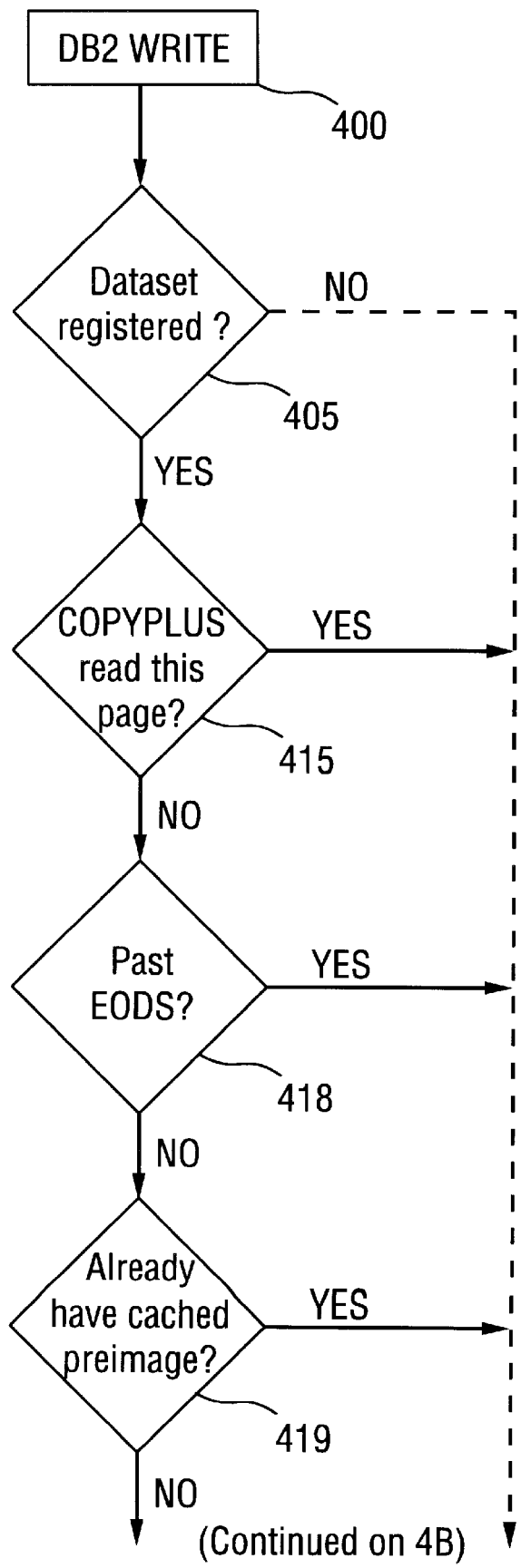
FIGS. 4a and 4b are flowcharts of XBM processing of data writes.
Figure 4B:
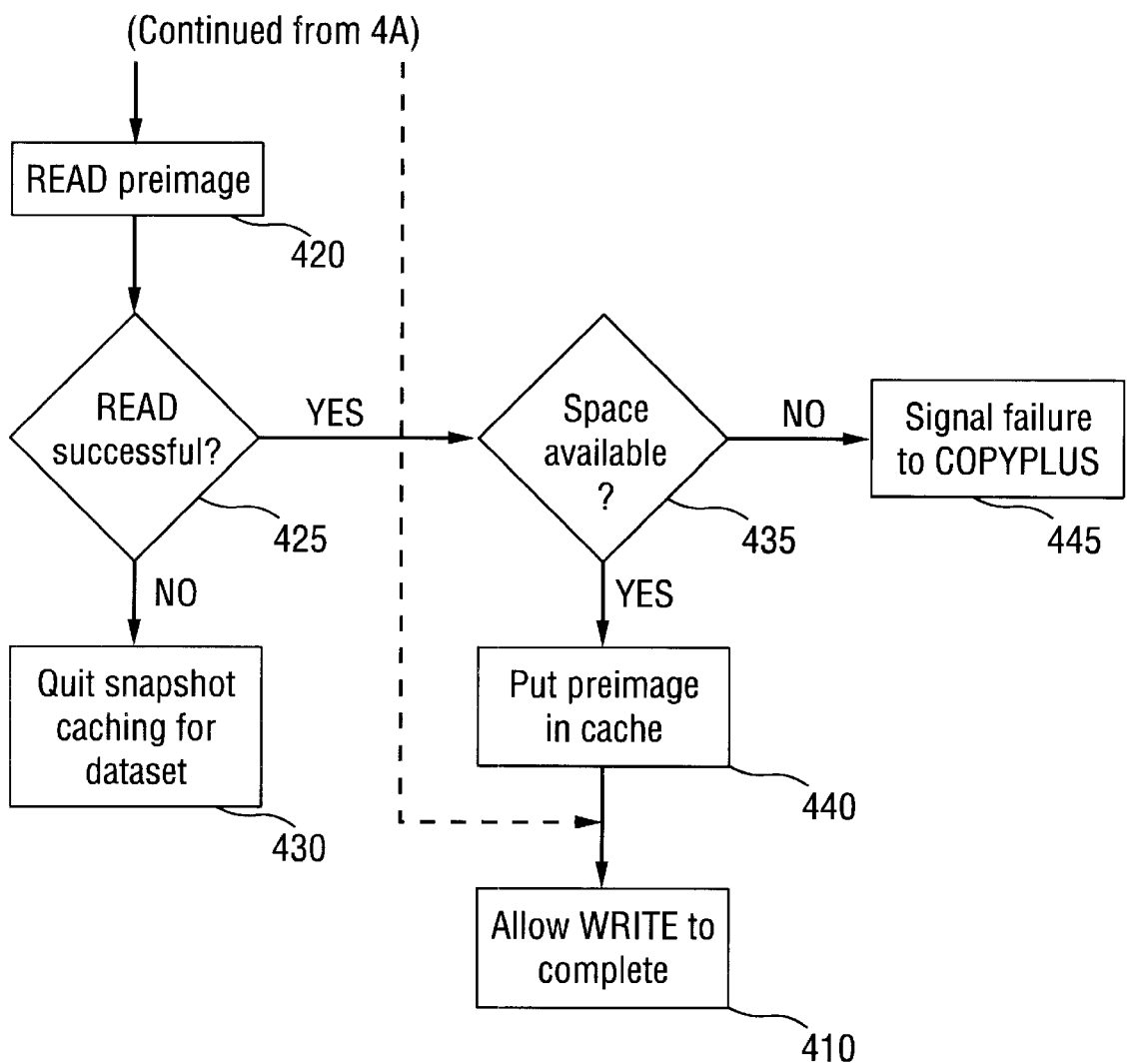

Referring to FIG. 4A and FIG. 4B, in response to the start-copy signal at step 315, XBM begins monitoring all WRITE commands issued by DB2 that are directed to the data set 102.

Block 400: each time DB2 issues a WRITE command, XBM intercepts it as described in detail in the supplemental disclosure below. Block 405: XBM determines whether the WRITE command applies to a data set 102 for which COPY PLUS has issued an XBM registration signal (step 302) and a start-copy signal (step 315). If not, at block 410 XBM passes the WRITE command through to MVS to be executed, with no caching action performed by XBM.

If the following conditions exist:
1. the data page 1, 2, 3 to be updated by the WRITE command has not already been read by COPY PLUS (block 415), and
2. the WRITE command does not specify a relative byte address past the end of the data set 102 at the time the start-copy signal was received (block 418), and
3. a cached image copy of the data page in question does not already exist (block 419), then XBM reads the data page in question as it exists on the DASD 100 (block 420). Caching action is skipped if a cached preimage already exists (block 419) because the data page as it exists on the DASD 100 presumably no longer reflects the information content of the data page as it existed at the time of the start-copy command at step 315. If the READ operation is not successful (block 425), then XBM ceases attempting to create snapshot cache images for the data set in question (block 430).

If the READ operation was successful and space exists in XBM's cache (block 435), then XBM writes a copy of the page image to the cache (block 440) and passes the WRITE command on to MVS for execution (block 410). The cached image is referred to as a "cached preimage."

Figure 5A:
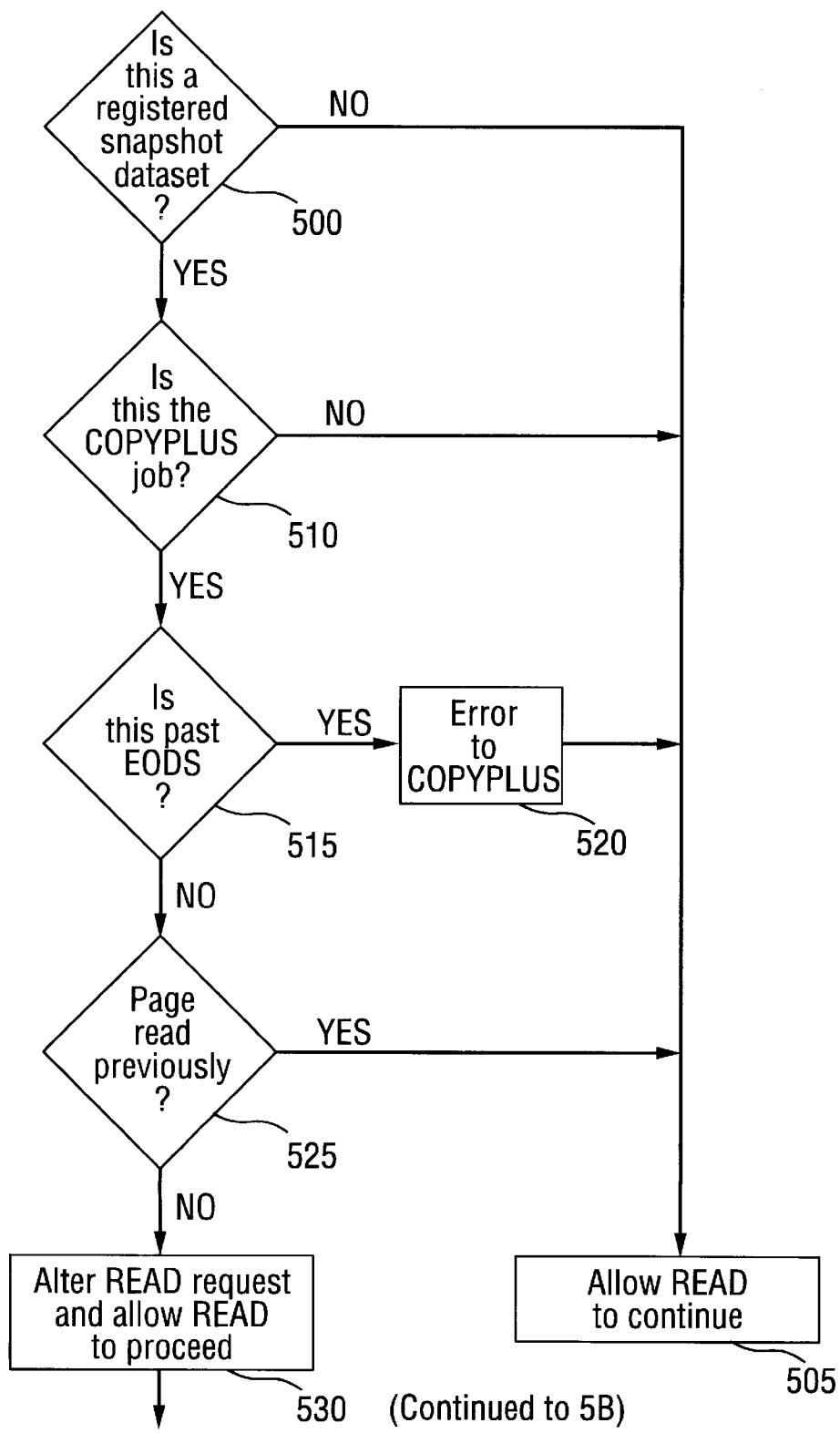
FIGS. 5a and 5b are flowcharts of XBM processing of data reads.
Figure 5B:
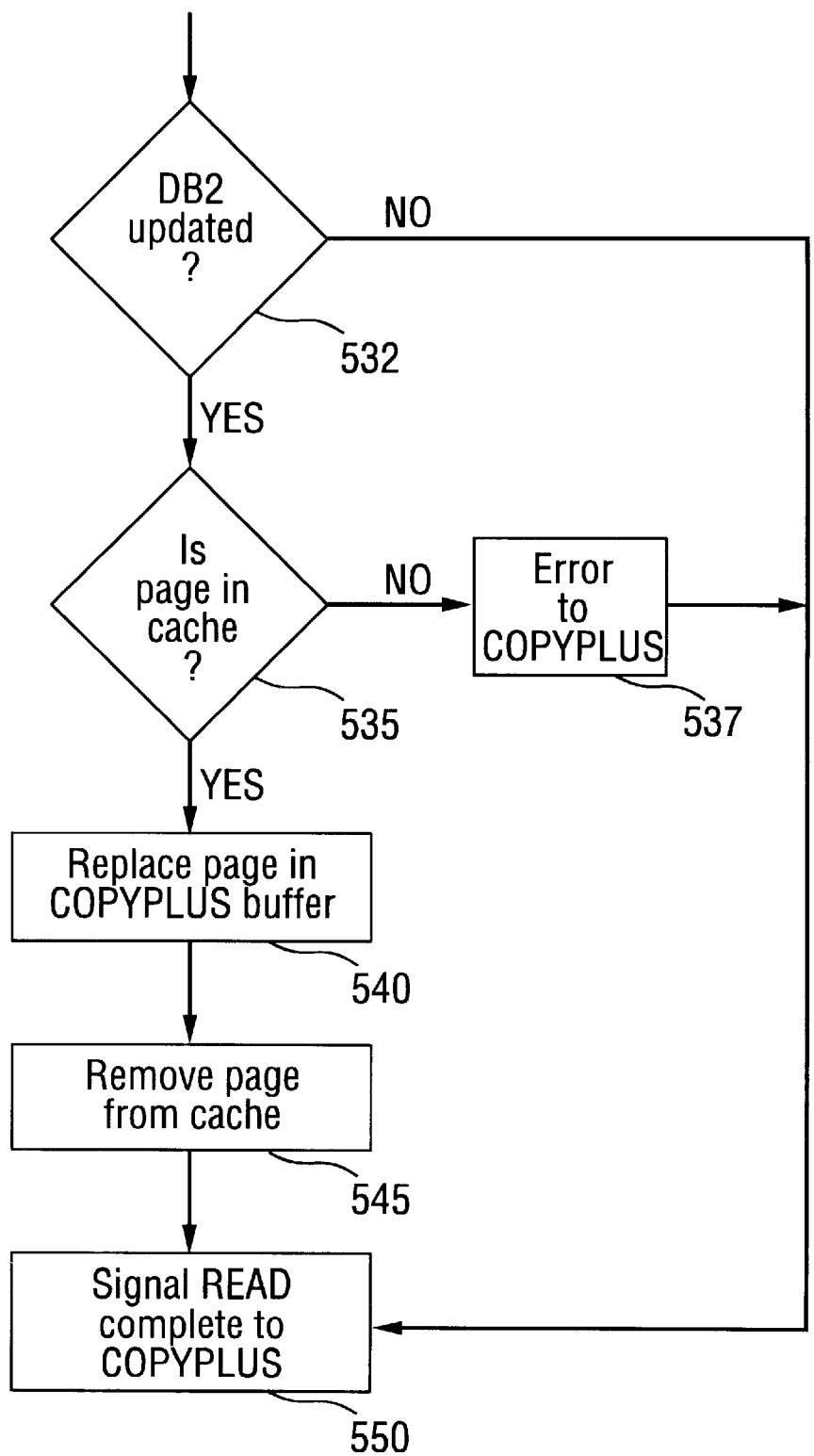

Referring to FIG. 5A and FIG. 5B: in parallel with monitoring WRITE requests generated by DB2, XBM also intercepts each READ request issued to MVS. A method of accomplishing this is disclosed in the supplemental disclosure below.

Block 500: XBM determines whether the READ request relates to a data set that was previously registered by COPY PLUS as a snapshot data set. If not, the request is passed to MVS for execution (block 505). As is well known to those of ordinary skill, each such READ request specifies a portion of the data set 102, e.g., data page 2, to be copied to the buffer 105; when so copied to the buffer 105, that portion of the data set is referred to as a buffered data portion.

Blocks 510, 515, 520, 525: XBM (a) determines whether the READ request in question was issued by the COPY PLUS job that registered the data set 102 as a snapshot data set by comparing its MVS job identification, determined in conjunction with step 302, with that of the process issuing the READ request; (b) determines whether the READ request specifies a relative byte address for the data page to be read that is within the data set in question as of the time the start-copy signal was generated; and (c) confirms that the data page has not previously been read. If any of these conditions is not met, then the READ request is passed to MVS for execution (block 505). If clause (b) is not met, XBM additionally returns an error message to COPY PLUS (block 520).

Block 530: XBM alters the READ request to indicate that, after the request is "completed," i.e., reported as complete by MVS, MVS should pass control back to XBM rather than back to COPY PLUS. (A method of doing so is disclosed in the appendix reproduced below.) The READ request is then passed to MVS for execution.

Block 532: After MVS completes the READ request and passes control back to XBM, XBM determines whether the buffered data portion corresponds to an existing cached preimage by checking a directory of cached preimaged data pages (block 532) and checking whether the cached preimage is still in memory (block 535; the cached preimage may have been removed from memory for a variety of reasons, e.g., by being "stolen" by MVS). If the cached preimage is still in memory, XBM leaves the buffered data portion as-is, reports an error to COPY PLUS (block 537), signals to COPY PLUS that the READ request has been completed (block 550), and terminates snapshot caching of that data set. If the cached preimage is not still in memory, XBM overwrites the buffered data portion in the buffer 105 with the cached preimage (block 540); decaches the cached preimage (block 545), e.g., by marking the appropriate cache portions as being free for reuse; and passes control back to COPY PLUS (block 550)

The COPY PLUS program can, if desired by the user, ensure that it has not received an updated data page 2. For example, COPY PLUS can compare the relative byte address with values contained in the DB2 log reflecting the last update to each page, thereby allowing COPY PLUS to determine whether it has received a data page that was updated by DB2 subsequent to the start-copy signal. If such condition has occurred, COPY PLUS might assume that an XBM failure has occurred (e.g., an abnormal end to XBM program execution, a full-cache condition, or the like). In that case, COPY PLUS can, at the user's election, utilize the registration technique disclosed in U.S. Pat. No. 5,222,235, owned by the assignee of this application, to register the image copy of the data set 102 in the storage device 110 with DB2 as being internally inconsistent. Alternatively, of course, COPY PLUS can simply report an error and terminate.

A program storage device in accordance with the invention (e.g., a magnetic tape, a floppy disk, an optical disk, etc.) may be conventionally manufactured in the usual manner. For example, in one embodiment a machine-readable source code representation of a computer program of the kind described above may be converted into executable code via a compiler, an assembler, and/or a linker; the executable code may then be copied to a blank tape or disk, thus producing a program storage device in accordance with the invention. In another embodiment, a source code representation of such a computer program, written in a language appropriate to the machine in question (e.g., a computer system comprising one or more processors, memory units, communications channels, and the like), may be copied to a blank tape or disk to produce another embodiment of a program storage device in accordance with the invention.

The program storage device may be used in conjunction with a suitable computer or other machine by (i) causing the machine to read the source code or executable code from the program storage device in the usual manner; (ii) if the program storage device encodes source code, then causing the machine to execute one or more appropriate translation programs, e.g., a compiler, an assembler, and/or a linker, to convert the source code into executable code, and (iii) causing the machine to execute the executable code.

It will be appreciated by those of ordinary skill having the benefit of this disclosure that many variations on the basic themes described above are possible. For example, the illustrative data-accessing computer program described above was one for copying data sets. The same caching techniques can be used for data-accessing computer programs that unload, reorganize, integrity-check, or generate reports from data sets. In addition, any of the foregoing can be implemented on non-MVS platforms, e.g., UNIX, VM, MS-DOS, OS/2, Windows NT, OS/400, and the like. Accordingly, it is the claims below and not the illustrative examples above that are intended to define the exclusive rights asserted in the invention.

Supplemental Disclosure

Physical input/output operations (I/O), such as disk access, is generally the most time-consuming operation of any software application. Reducing the number of I/O operations performed in an application, therefore, results in a reduction in CPU usage and, thus, in improved application performance. XBM is the commercial name given to a software product sold by the assignee of the present invention which provides buffer management capabilities beyond those of standard MVS I/O access methods. XBM runs as a standard MVS subsystem, providing a reduction in physical I/O operations when reading and/or writing data. It creates and manages a collection of caches and associated data structures known as an extended buffer.

During operation, XBM intercepts memory I/O requests issued by "monitored" applications. It then checks to see if the requested data is within one of its caches, and, if so, returns the data to the calling application. Anytime this is accomplished a physical I/O operation has been eliminated. If the requested data is not in an XBM cache, XBM uses standard MVS access methods to retrieve the data and store it in its cache. A novel two-level Least-Recently-Used algorithm is used to update XBM caches.

Figure 6:
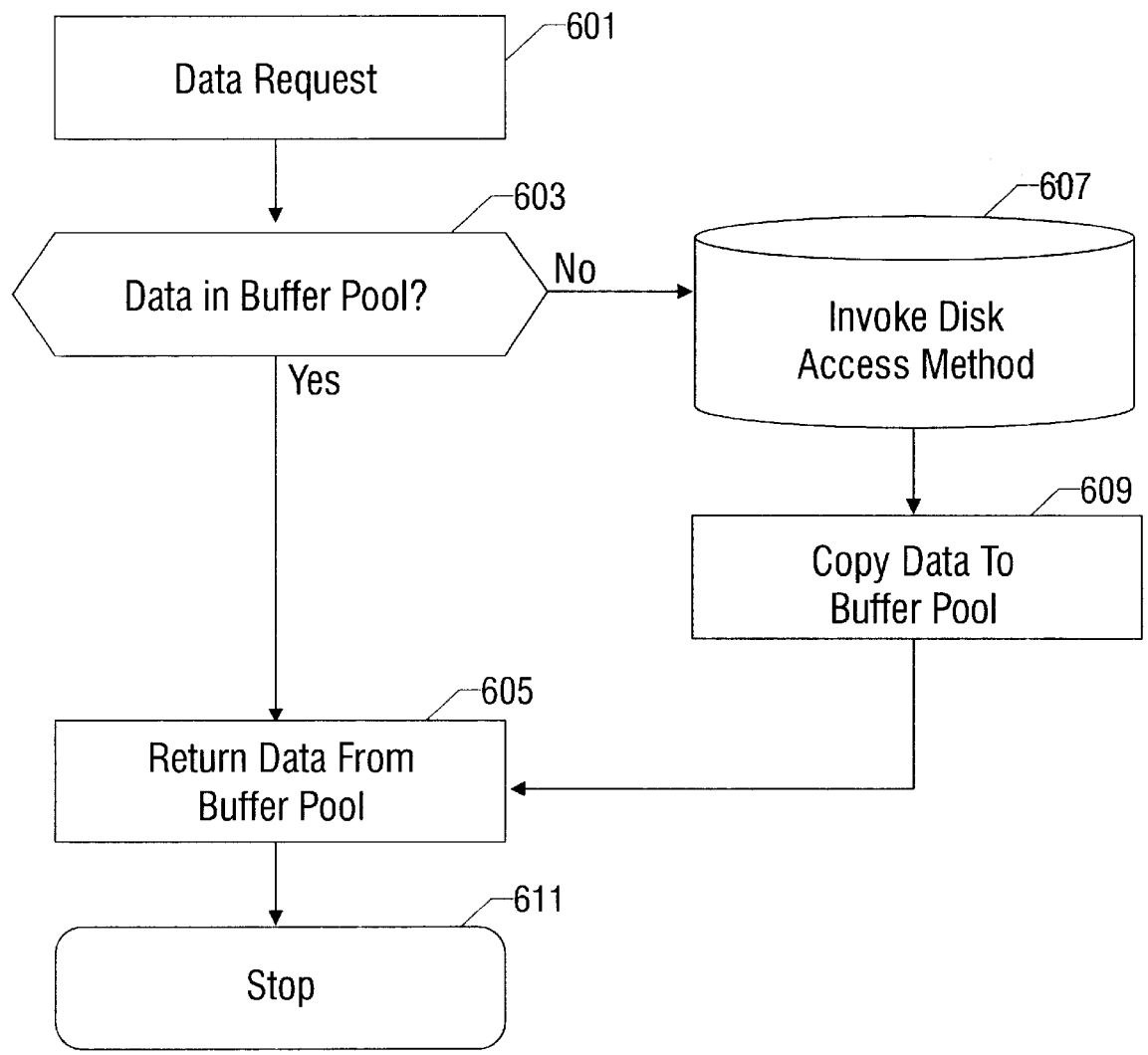
FIG. 6 shows a prior art process for accessing data in a DB2 system.
Figure 7:
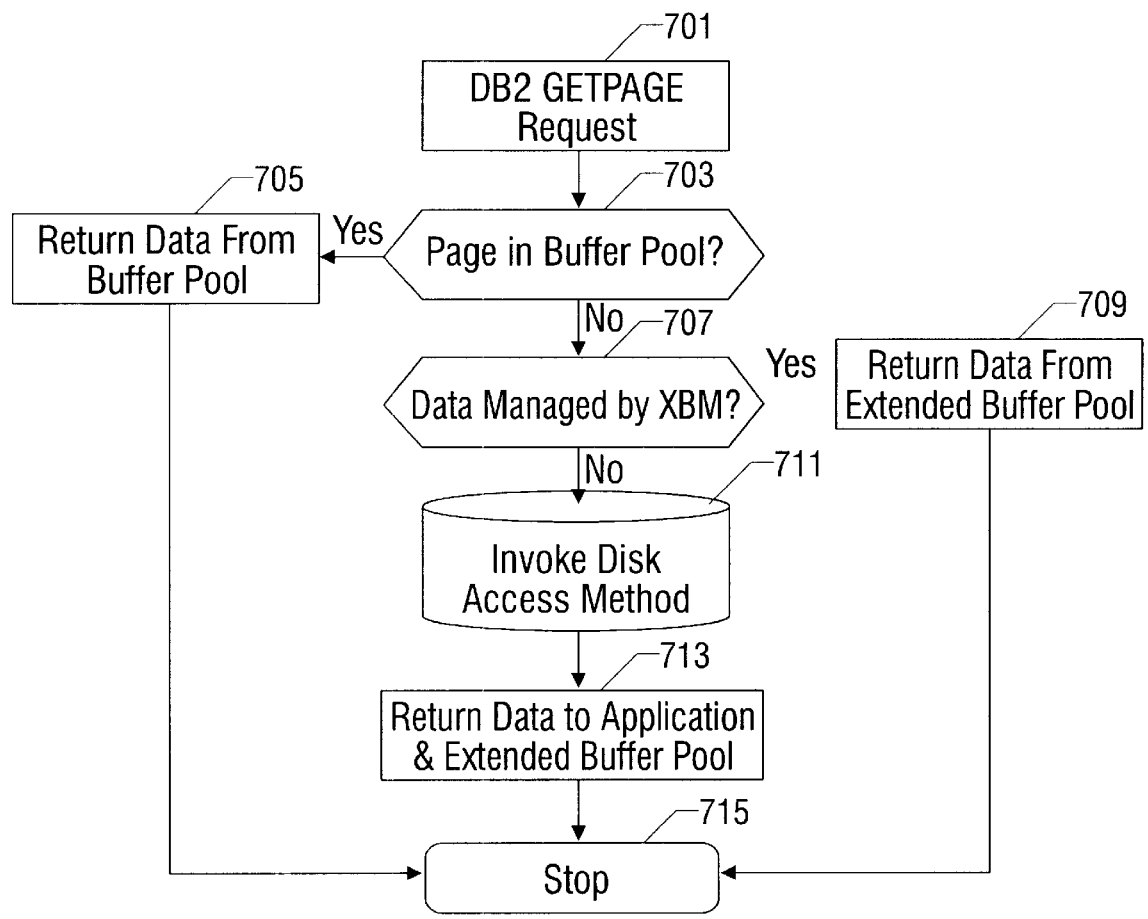
FIGS. 7a, 7b, and 7c are flow charts of XBM accessing data.

As shown in FIG. 7, a method in accordance with the invention improves upon the prior-art process shown in FIG. 6. As shown at box 701 for an illustrative system involving the well-known IBM DB2 system, a user process (e.g., a DB2 installation executing a particular user job), issues a GETPAGE request for data as shown in box 701. If the requested data is available in a buffer pool, as shown at box 703, the data is returned to the requesting process from the buffer pool. On the other hand, if the data is not available in the buffer pool, a series of additional steps is executed by a management process, shown in figures as XBM, before performing a disk access. If the data in question is being managed by the XBM process, as shown at box 705, the requested data is retrieved by XBM from an extended buffer in system memory shown at box 709 and returned to the requesting process. Otherwise, the requested data is retrieved from disk storage, shown as DASD (Direct Access Storage Device) 707.

Figure 8:
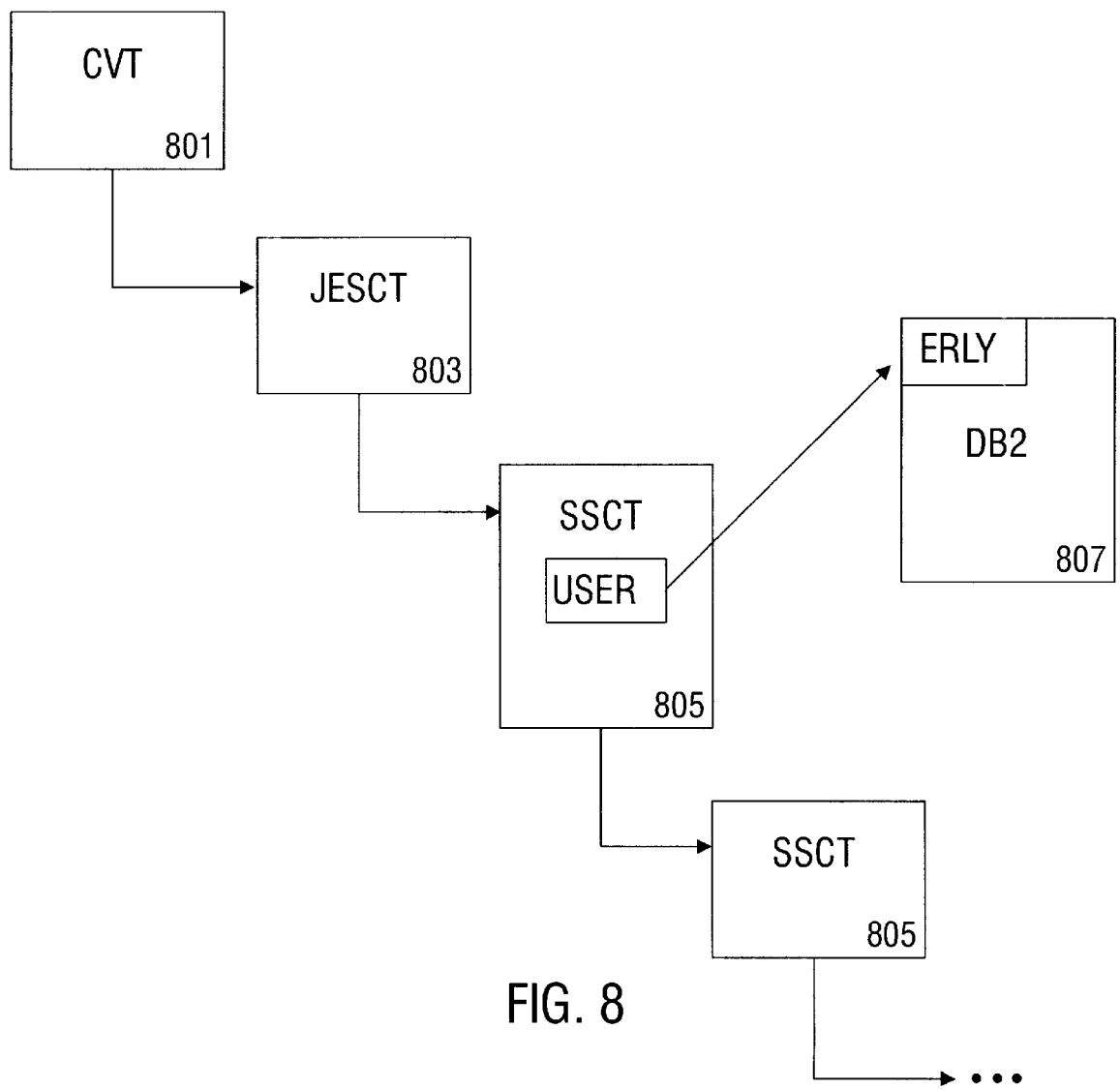
FIG. 8 shows tables generated by XBM.

Referring to FIG. 8, upon installation of the XBM system (e.g., as an MVS subsystem), the first task approached by XBM is to build a table of other subsystems or other programs for which XBM will manage data requests. The XBM installation routine scans the subsystem control table control blocks, box 805. XBM checks the pointer value stored in the user field of the SSCT; this pointer provides the address of a subsystem control block which identifies the subsystem in an "eye catcher" field, shown as a DB2 subsystem 807 having an eye catcher ERLY. Alternatively, of course, XBM could determine "on the fly," on a real-time basis, whether the data request in question was issued by a subsystem that is being managed by XBM, but that of course would entail additional overhead.

In initializing itself, XBM builds an "object-oriented" representation of the other subsystems for which it is managing data requests. Object-oriented programming is well-known in the software industry; familiarity with the basic concepts thereof is assumed.

Figure 9:
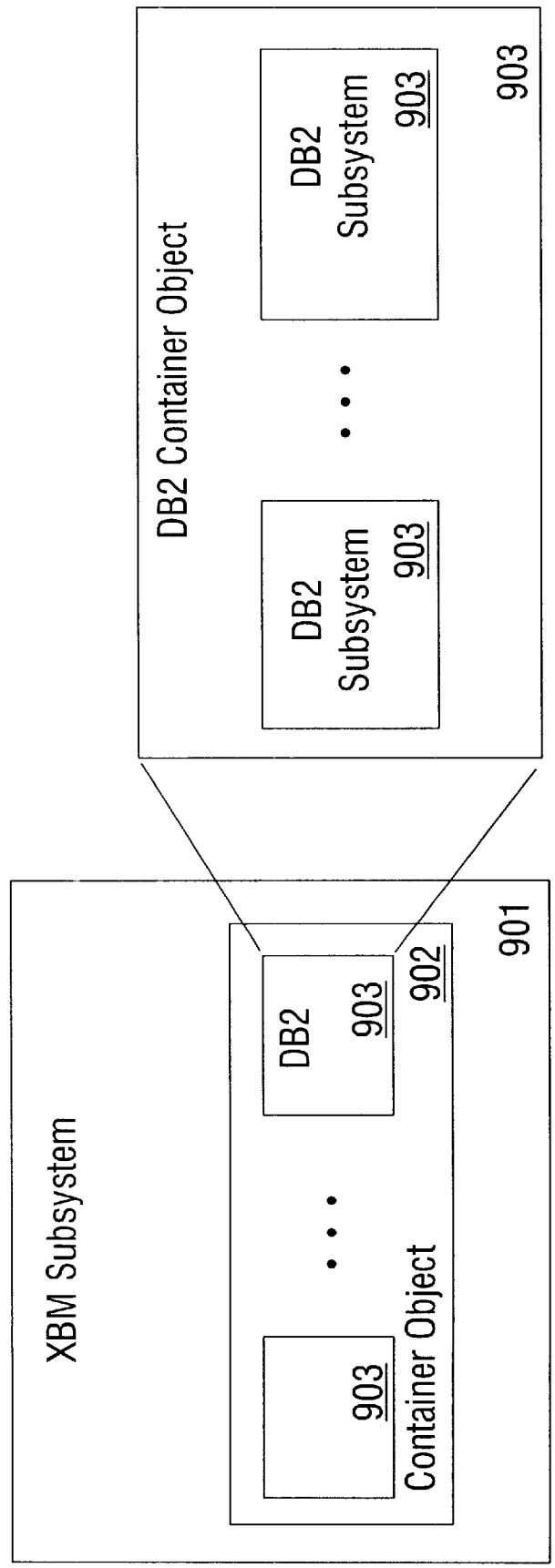
FIG. 9 shows various programming objects used by XBM.

The object-oriented representation referred to above can be understood with reference to FIG. 9. The XBM subsystem 901 includes storage allocated as a container object 902. The container object includes one or more pointers 903 pointing respectively to members of the respective component classes. As illustrated in FIG. 9, one such component class is a DB2 component; this component itself includes pointers to memory in which is stored representations of respective DB2 subsystems 905.

XBM makes use of a class of objects known as a "bag," which is a class that describes a hashed container. Wherever practicable, a bag container is used for access performance. For example, the component container 902 is a bag. The hash algorithm used will depend on the objects that are contained within the container. In other words, each object that is placed into a container has its own methods for hashing itself to optimize its own performance. In the case of a DB2 subsystem the hash algorithm may include obtaining the first four letters of the DB2 subsystem and dividing by the size of the hash table. The remainder resulting from that computation becomes the hash value for a lookup into the hash table.

Figure 10A:
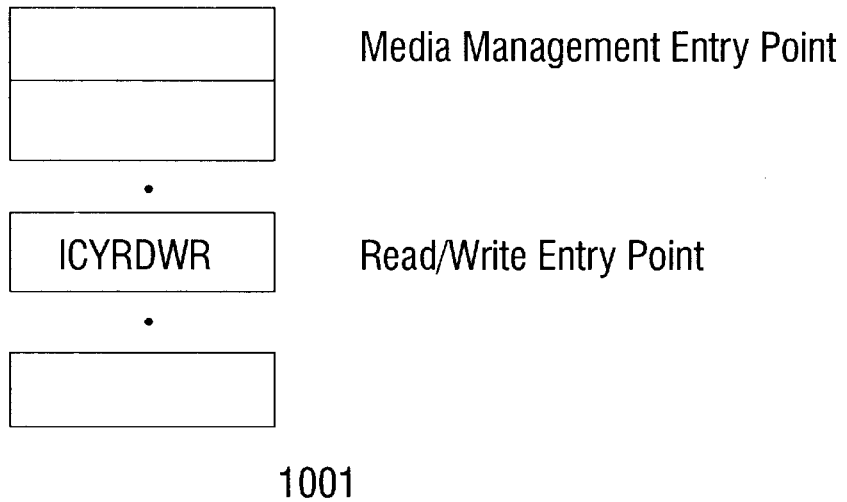
FIG. 10 shows a before and after illustration of the MMVT.
Figure 10B:
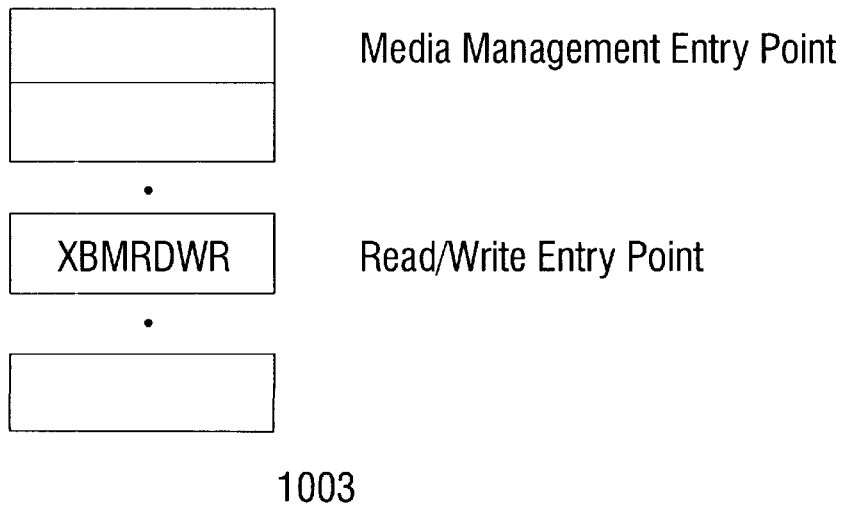

Use of the method entails utilizing an example of the well-known "hooking" technique to intercept read/write service calls issued by, e.g., application programs running under the MVS operating system. Referring to FIG. 10, a before-and-after illustration of the Media Manager Vector Table MMVT maintained by MVS is shown. As is well known to those of ordinary skill and documented in several IBM publications such as the Media Manager Diagnosis Guide, the MMVT is a table that includes vectors to addresses of specific locations in memory; the respective addresses are for various series of instructions for performing specified services. For example, referring to box 1001 (a "before" illustration of the MMVT), a table entry ICYRDWR is shown. This table entry contains the address in storage of a series of instructions for performing the standard MVS read/write service. After the XBM program is installed in the system by a user such as a system administrator, the MMVT vector table is overridden at the ICYRDWR table entry with the address of XBM's own instructions for performing the read/write service (actually, for performing front-end processing for that service), as shown at box 1003.

Figure 11:
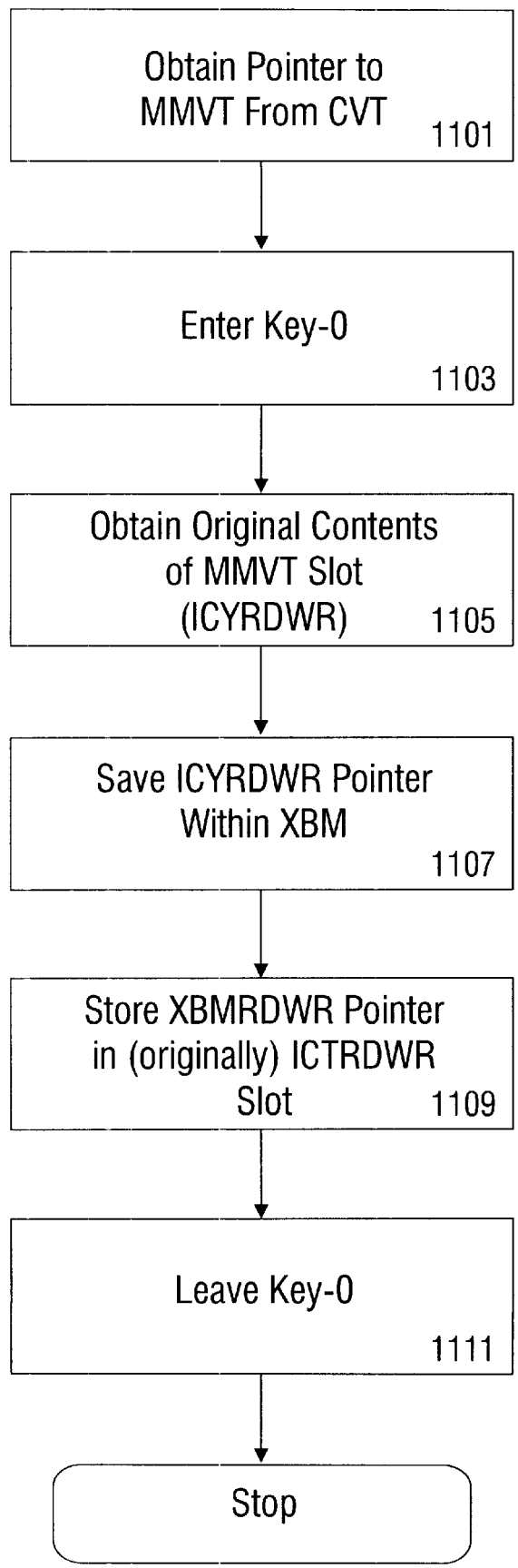
FIG. 11 shows the process of overriding the MMVT.

The process by which the MMVT is overridden as described in the previous paragraph is illustrated in FIG. 11, which describes the process of actually hooking the XBM process into the operating system at box 1101. A pointer to the MMVT is obtained from the communications vector CVT maintained by the MVS operating system. At box 1103, the XBM process obtains "Key 0" authorization. As well-known to those of ordinary skill and extensively documented in various IBM publications, Key 0 is a user authorization level that permits a process to have essentially unlimited access to system resources. At box 1105, XBM obtains the original contents of the vector table MMVT at the ICYRDWR slot. At box 1107, XBM saves the original contents of the vector table into its own storage such that it can use that address to continue the original process as necessary. At box 1109, XBM stores the pointer to itself into the MMVT at the ICYRDWR slot. This allows XBM to intercept all requests to the media manager for read/write access. At box 1111, XBM leaves Key 0 privilege mode.

(The XBM process preferably does not restore the original table entry for the ICYRDWR slot in the vector table MMVT. Rather, XBM simply disables its own preprocessing and, upon the occurrence of a data access request, simply passes control essentially immediately to the original address pointed to in that slot. As known to those of ordinary skill, restoring the original address directly to the MMVT slot could have consequences incapable of being anticipated, including, perhaps, crashing the system.)

Figure 12A:
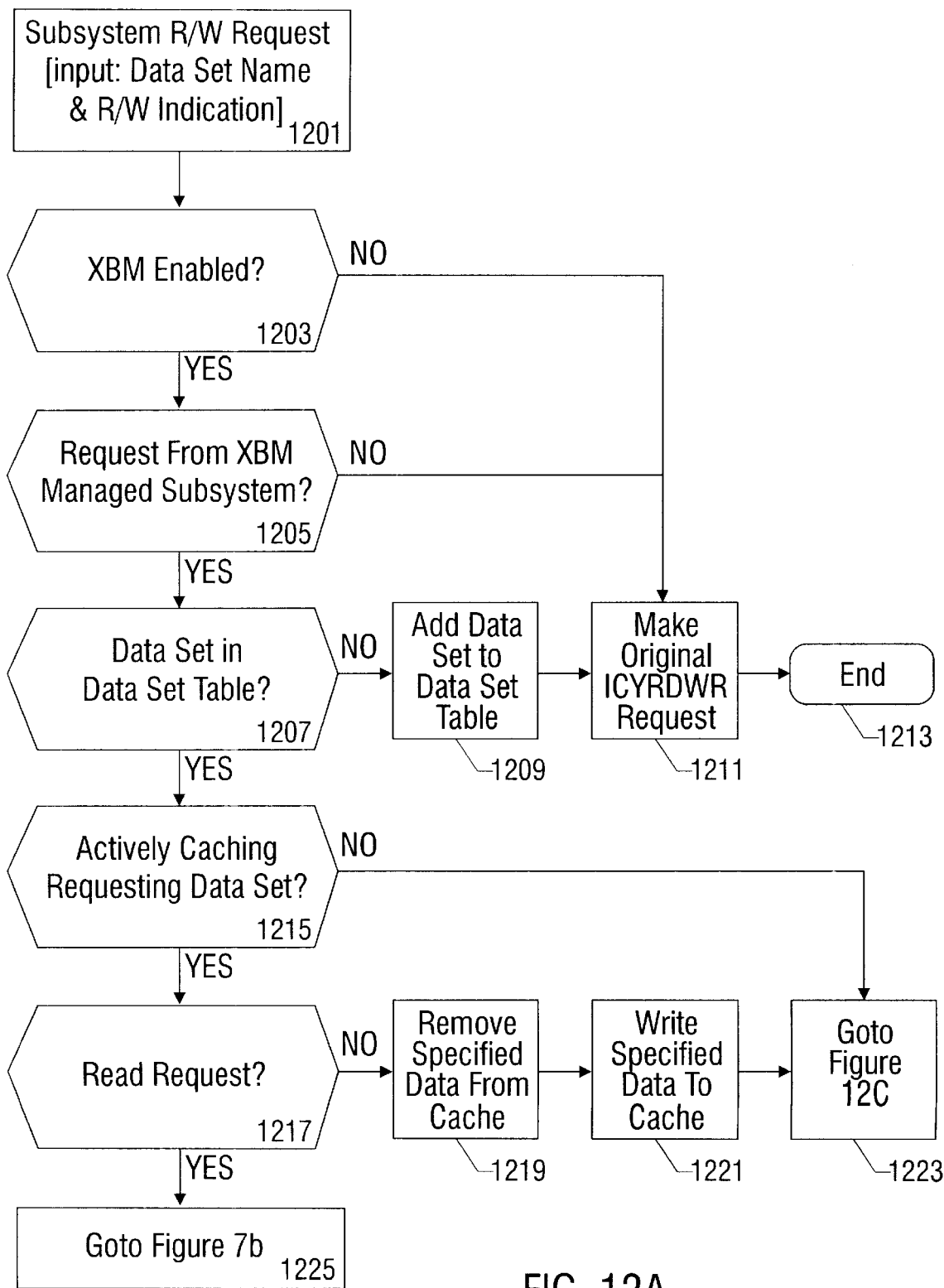
FIGS. 12a and 12b show the steps of processing a data request.

FIG. 12*a* depicts the method steps performed in pre-processing a data request from a calling process such as an application process (sometimes referred to below as a "caller"). At box 1201, the XBM subsystem receives a read/write request. At box 1203, a test is made to determine whether XBM is enabled; if not, the original routine ICYRDWR is invoked at box 1211.

At box 1205, a test is made to determine whether the data request is from a subsystem being managed by XBM. If not, the original routine ICYRDWR is invoked at box 1211 as noted above.

In box 1207, a test is made whether the data set is in the data set table 1401 maintained by XBM (discussed in more detail below with reference to FIG. 14). If the data set is not already in the data set table 1401, at box 1209 the data set is added to table 1401 and the original ICYRDWR routine (described below as a "media manager" routine) is invoked at box 1211 as described above.

At box 1215, a test is made whether or not the data set is actively being cached by XBM. A user such as a system administrator may activate a data set for XBM caching using the controls provided by XBM. If the data set is not being actively cached, then XBM issues the appropriate media manager request as shown in FIG. 12*c* and returns the resulting data to the caller. This is done in order to capture the performance statistics both before and after the request is serviced by the media manager itself.

As shown in FIG. 12*c*, at box 1247 the media manager interface block (documented in the aforementioned IBM publications) is modified so that the media manager returns control to XBM after completion of the I/O request processing. At box 1249, the original ICYRDWR routine is invoked, resulting in asynchronous processing as shown in boxes 1255 through 1263. At box 1257, if the current request is a read type request, then the data that was read from the disk is added to the cache at box 1259. At box 1261, the calling process is notified of I/O completion.

On the other hand, if the data set is indeed being actively cached by XBM, then at box 1217 a test is made for whether the current request is a read-type request. If not, then at box 1219 all of the blocks requested are removed from the XBM extended buffer, also referred to as the "cache," referred to at box 1307 and described in more detail below with reference to FIG. 13. This is done to avoid any duplicate data in the cache. The data to be written to the disk is then added to the extended buffer at box 1221. When this is complete the process branches to perform the steps shown in FIG. 12*c* and described above.

It will be apparent from FIG. 12*c* that the media-manager request issued as shown in box 1249 that figure differs from the request as issued at box 1211 in FIG. 12*a*, in that the former is a call and the latter is a branch. In other words, control returns to XBM after the media manager request has been launched at box 1249 in FIG. 12*c*; in contrast, when the request is launched at box 1211 of FIG. 12*a*, control does not return to XBM.

Figure 12B:
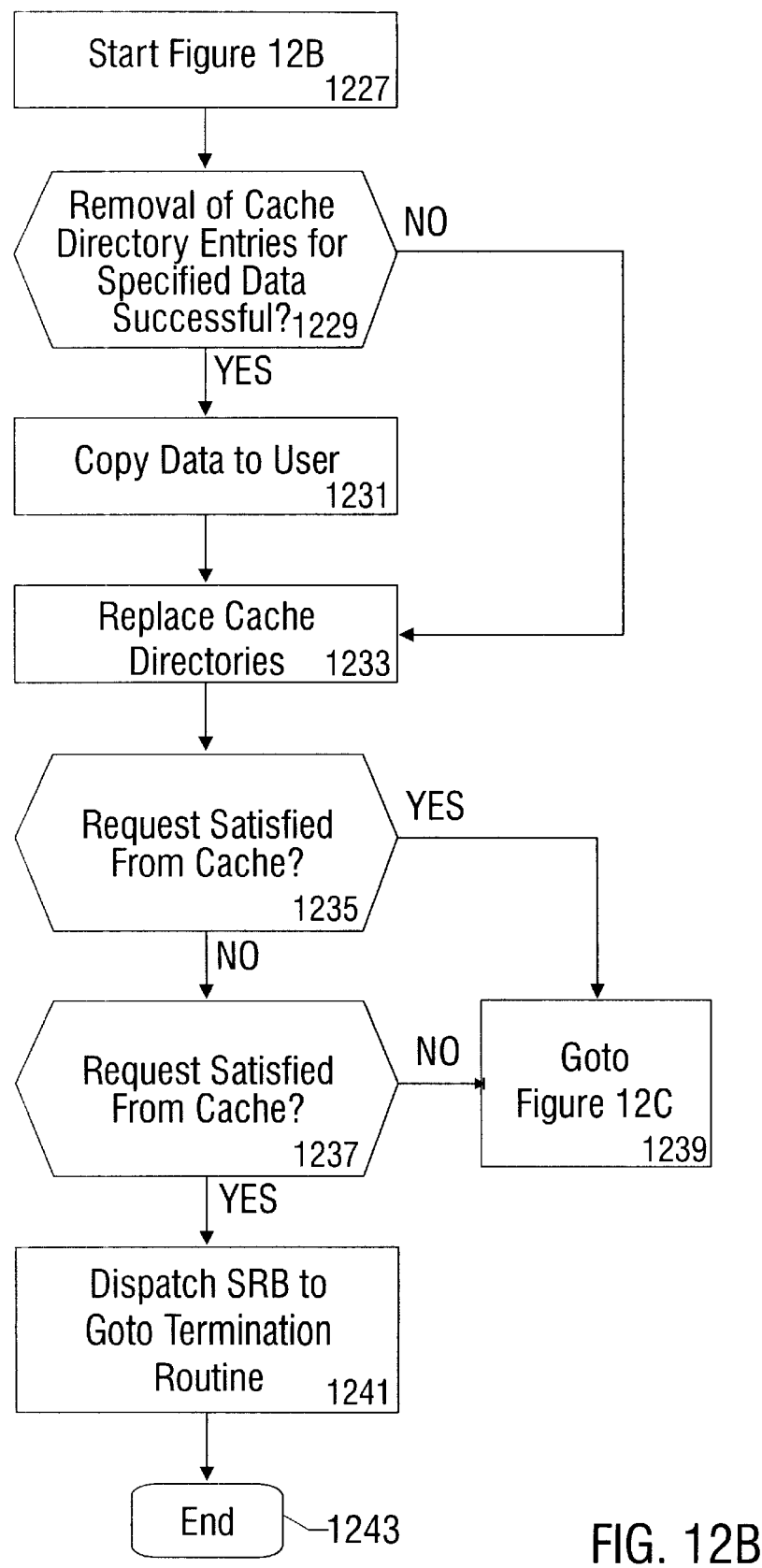
Figure 12C:
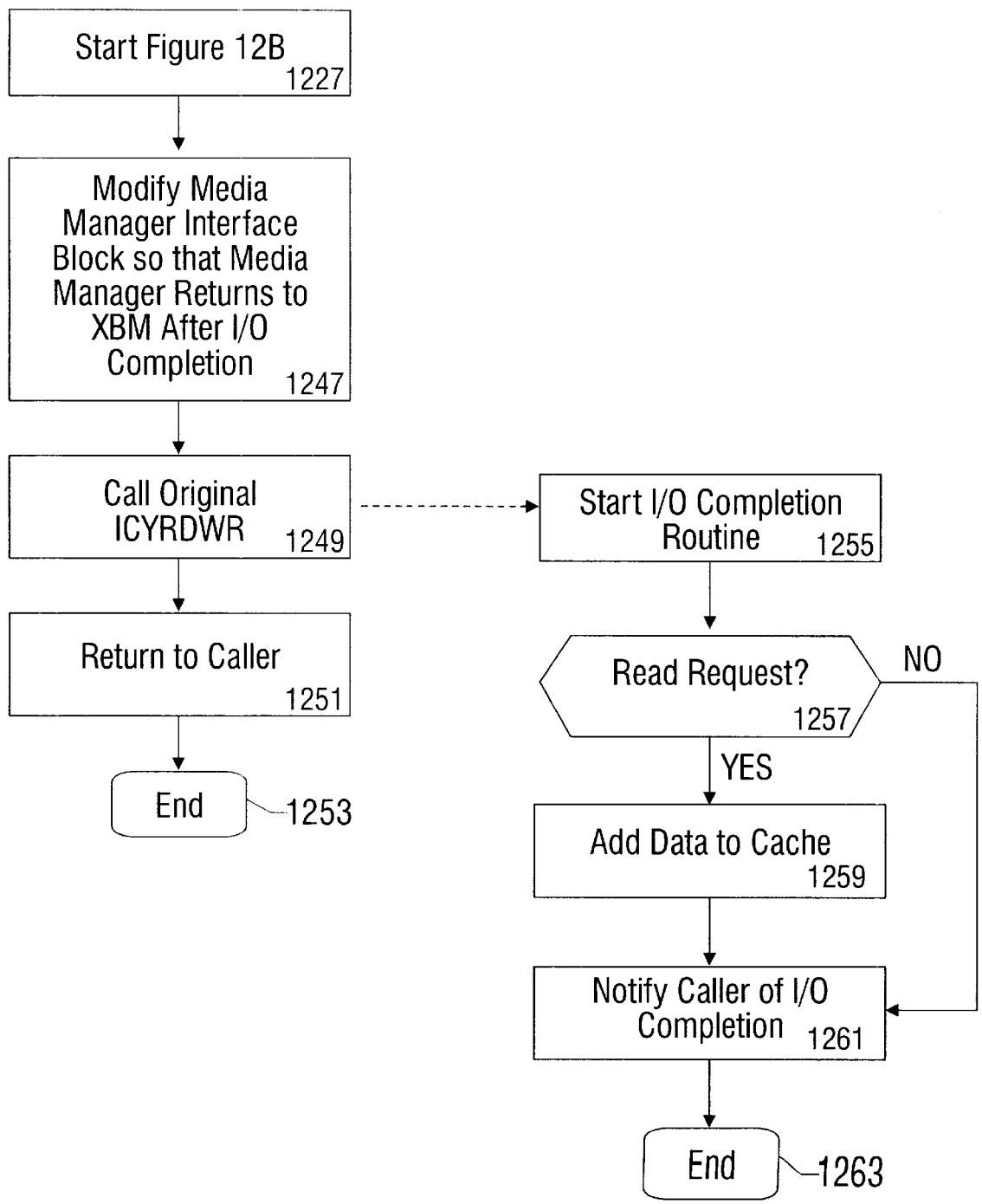
FIG. 12c shows the step of modifying the Media Manager.

Referring again to box 1217 in FIG. 12*a* and to FIG. 12*b*, if the media manager request is a read-type request, then at box 1229, XBM attempts to remove all of the requested blocks from the cache directory (as opposed to from the cache itself). This is done to prevent changes from being made to the cache for those particular data blocks (e.g., "pages" in DB2) while they are being read.

If at box 1229 the removal of all of the requested blocks was successful, then the requested data is copied from the cache to the caller's buffers in a simulated input of data from disk at box 1231. It will be apparent to those of ordinary skill that the data came from the cache instead of disk in this case. Assuming that this was successful (but even if it was not successful), box 1233 reverses the process of box 1229: XBM puts the directory entries for the blocks back into the cache directory so that they may be accessed again by another caller.

If XBM was unsuccessful in removing all of the requested blocks from the cache directory at box 1229, then the data copying step at box 1231 is skipped. This would occur, for example, in the event of a sequential prefetch request in which multiple blocks were requested but some of the blocks were not in the cache.

At box 1235, a test is made to see if XBM is in simulate mode. If so, a branch is made to the steps shown in FIG. 12c as discussed above. This causes XBM in simulate mode always to go to the media manager to satisfy the input or output request rather than satisfying the request from the cache. Simulate mode is designed to show the user of XBM exactly what to expect in the event that simulate mode were to be turned off or if the user were to select non-simulate mode. The statistics gathered are actual statistics for XBM performance, but XBM is not actually satisfying the request from the cache. Simulate mode may be thought of as a safety valve, a preliminary test while the user (e.g., the system administrator) becomes comfortable with the idea of caching.

At box 1237, a test is performed whether XBM has been successful at satisfying the input request from the cache. If so, then at box 1241 XBM dispatches an SRB (service request block, a well-known method of requesting that MVS schedule a unit of work) whose purpose is to branch to the original caller's termination routine. Once the SRB is dispatched, XBM returns to the caller at box 1243 indicating to the caller that the input request has been started successfully. Otherwise, control is passed to the steps shown in FIG. 12c as discussed above.

Figure 13:
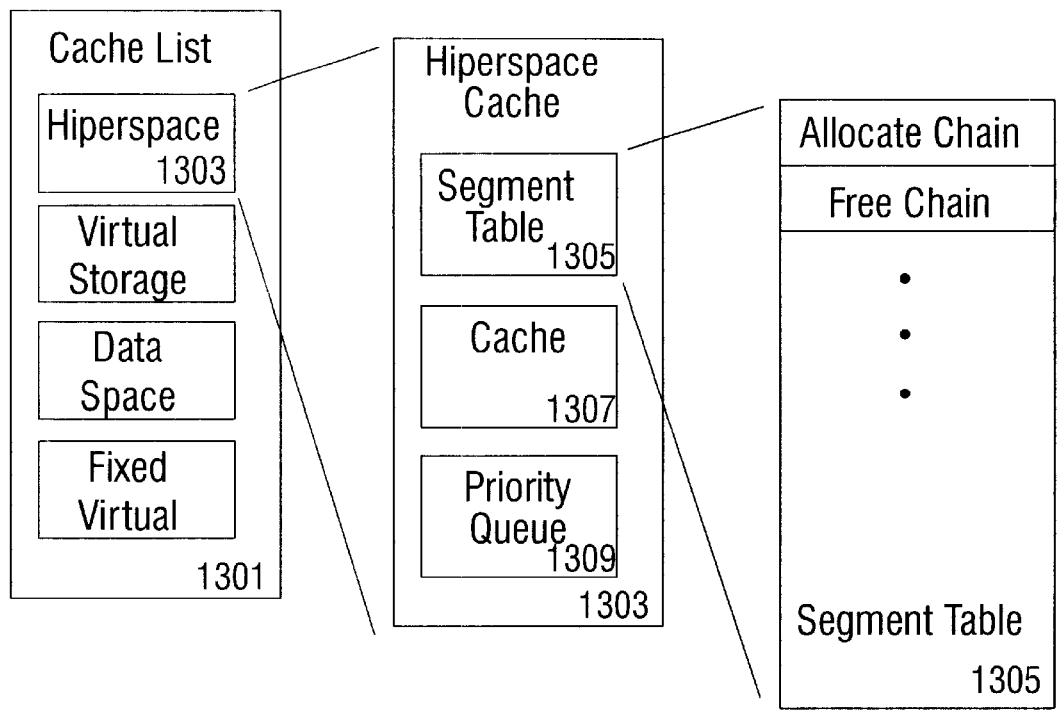
FIG. 13 show some of the control blocks used by XBM to allocate space.

FIG. 13 depicts some of the control blocks used by XBM to allocate space in the extended buffer referred to at box 1307. Box 1301 depicts a container object called the cache list, containing control blocks that describe the four possible types of cache managed by the illustrative implementation. These are hiperspace cache, the virtual storage cache, a dataspace cache, and a fixed virtual storage cache. The cache list 1301 is an extendable list of pointers to other memory addresses; while the cache list 1301 shown in FIG. 13 includes four such pointers such as box 1303, it will be apparent to those of ordinary skill having the benefit of this disclosure that a larger number may readily be included.

Referring to box 1303, a cache object includes three elements that are used in the management of that particular cache. The first element is a segment table box 1307 (more precisely, a pointer to the segment table block). The cache object also contains a pointer to the cache 1307 itself (or in the case of a hiperspace cache, a pointer to a control block that describes the cache 1307, because the hiperspace cache does not exist in real memory but in expanded memory). Box 1309 is a priority queue (actually a pointer to a priority queue) which keeps track of the best data set from which to "steal" in the event that the cache is full and a page or block in the cache needs to be replaced by a newer block.

Referring in particular to box 1305, the segment table includes a number of four-byte pointers, with one pointer per cache segment. A segment is a slice, i.e., a 1,024-byte portion, of the cache. Slicing the cache helps gain the benefits of compression as described below. In the case of a hiperspace cache, the unit of data exchange between hiperspace and real memory is 4,096 bytes. One cannot move any less than 4,096 bytes. Therefore, to gain the benefits of compression, XBM divides a 4,096 byte cache frame into four parts. Each part is known as a segment. The segment table includes one free chain which describes the segments which are not currently in use in the cache. The segment table also contains a chain of segments for each block that is allocated to a data set in the cache.

Figure 14:
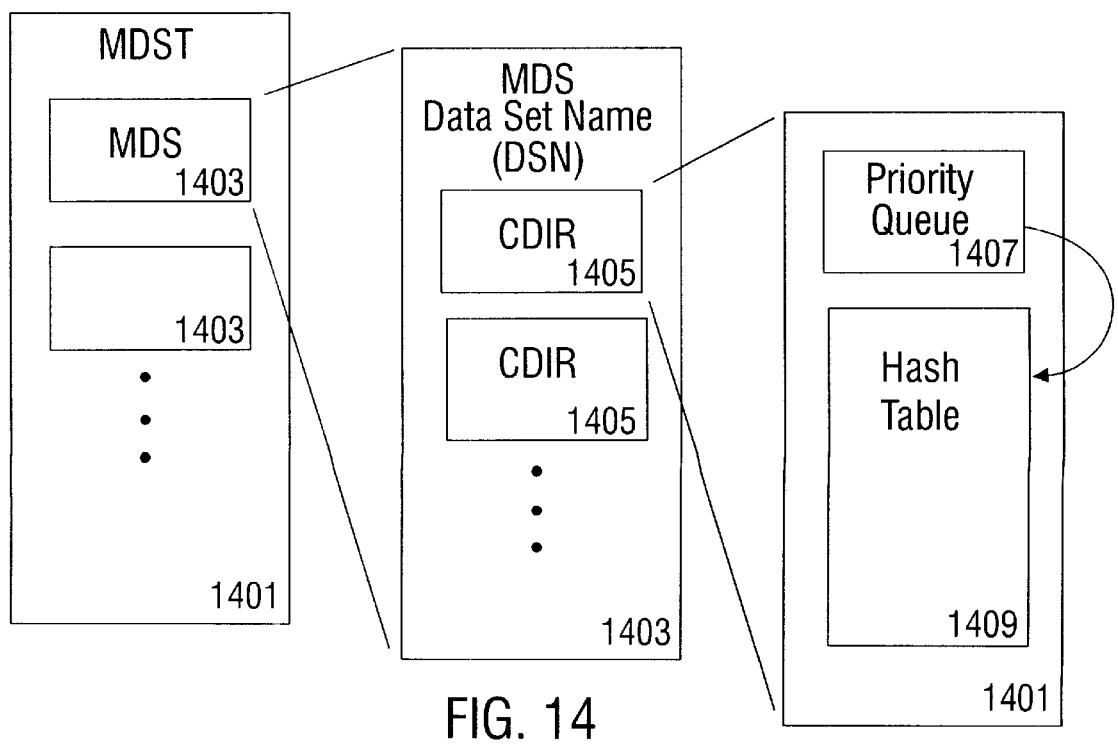
FIG. 14 shows managed data set tables used by the XBM Media Manager Intercept.

Referring to FIG. 14, the XBM Media Manager Intercept uses the managed data set table 1401 which is a set of managed data sets to quickly look up the corresponding managed data set in the table. If the media-manager request data set is not currently in the table, then a new entry is made in the table. The contents of a managed data set are the data set name which is used to compute the hash value for the managed data set and (in the illustrative implementation) up to four cache directories, although there is no actual limit to the number of cache directories that can be used by ("owned by") a managed data set.

The cache directory, box 1405, describes the blocks that are allocated to a particular cache for that data set. A cache directory contains two sub-boxes 1407 and 1409. Box 907 is a priority queue which maintains the time order that the blocks were entered into the cache for the data set in question. As is well-known to those of ordinary skill, the priority queue may be used to discover the oldest block quickly. A user may selectively control the priority of particular data sets or other objects for residence in the cache.

The other box in the cache directory, box 1409, is a hash table that contains a pointer to the cache segment table 1305 for each data block that the data set has allocated in the cache. The hash table also contains a time stamp for that block and a key for the data block; in this implementation the key is the relative byte address of the block in question.

Figure 15:
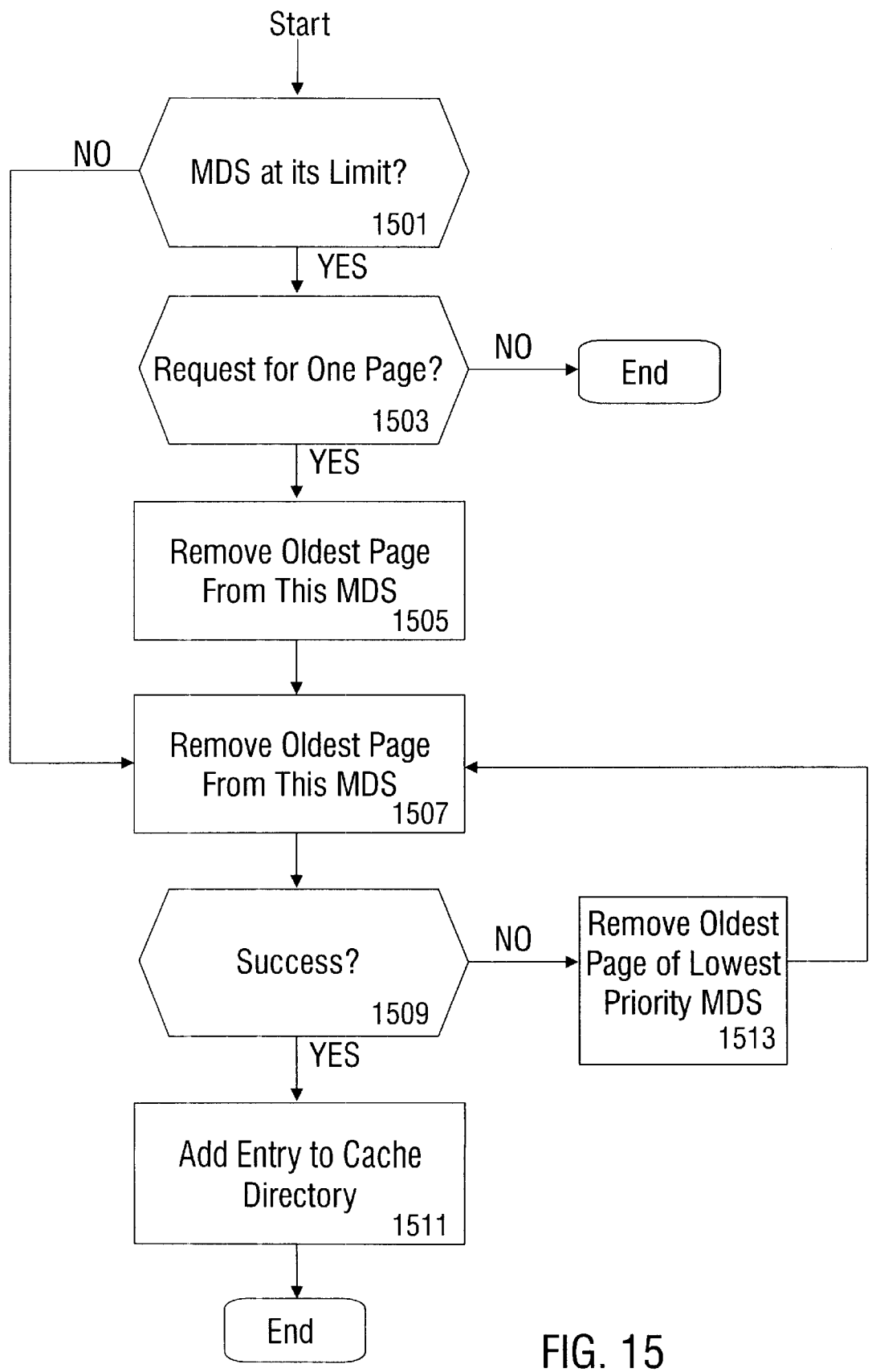
FIG. 15 shows the cache replacement strategy used by XBM.

FIG. 15 describes the cache replacement strategy that XBM uses, cache replacement being the concept of discovering which is the best data block in the cache to remove in order to place a newer, better data block into the cache. The term "data block" is used instead of the more conventional "page" because the latter term is associated with DB2 specifically.

To begin the algorithm at box 1501, a test is made as to whether the managed data set being processed by XBM has reached the limit of the number of bytes it is allowed to have in the cache. This limit is set by the user using the controls provided by XBM. If the data set is at its limit, XBM wishes to remove the block that is owned by this data set that is the oldest. However, at box 1503, a test is made to determine whether the current request is a request for one page only. The purpose of this test is to prevent multiple page requests from flushing the cache. It was determined empirically that in some cases a data set's pages would be replaced just before the time they were needed to be used again. The cache hit ratio was zero in that event. This test at box 1503 causes the cache to contain its limit worth of blocks in spite of the fact that all the requests for the data are multi-page requests.

If the request is for one block only, then XBM removes the oldest block from this data set's cache. If the request is for multiple blocks, then the current new block going into the cache is not placed in the cache. Replacement of the older blocks is avoided in that case. Removing the oldest blocks from the managed data set is box 1505. If the managed data set was not at its limit, then a branch is made to box 1507 where XBM attempts to add a new block to the cache. If at box 1509 the attempt to add the block to the cache is successful, then the cache directory is updated with the new entry at box 1511. If the attempt to add the block to the cache is unsuccessful because the cache is full, then box 1513 describes the process to remove the oldest box of the lowest priority data set.

Once the oldest block of the lowest priority data set has been removed, a looping branch is made to 1507, and a new attempt to add the block to the cache is made.

Figure 16A:
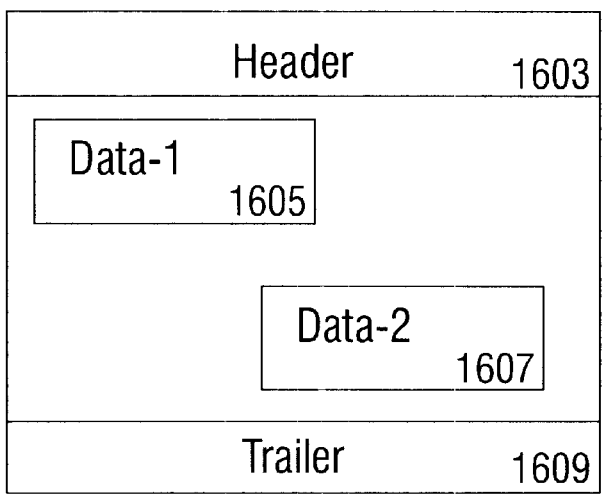
FIG. 16 shows compression and extension algorithms used by XBM.
Figure 16B:
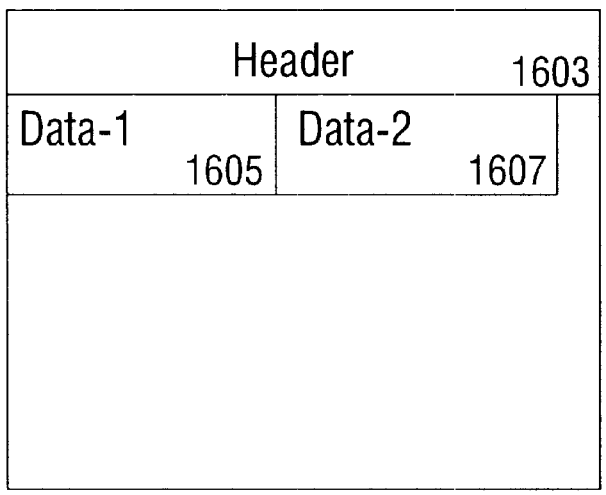
Figure 16C:
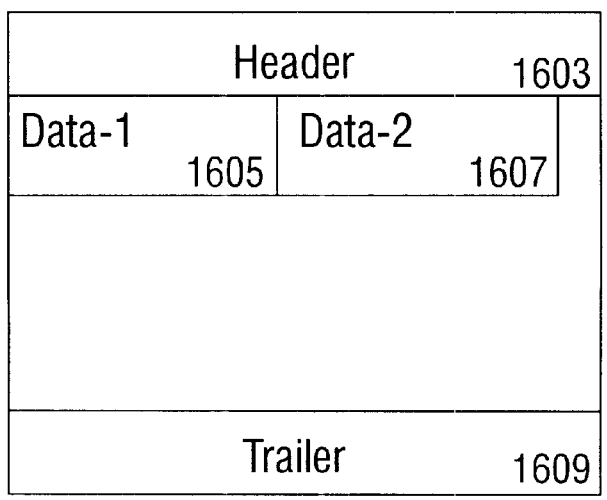

FIG. 16 diagrams the compression and extension algorithms used by XBM in reference to DB2 data page specifically. Compression is implemented and available to the user to provide several potential benefits. Compression allows more data pages to fit into a specific amount of cache than could fit if it were not compressed. Also, a side benefit of this process is that DB2 receives a free space reorganized page which improves performance for subsequent DB2 row updates.

Box 1601 depicts a DB2 data page and how it would look after some typical update use in that it contains the header box 1603 that describes the page, it contains a trailer at the end of the page box 1609 that describes where each row of data is on that page and, in this example, two rows of data blocks 1605 and 1607 which are interspersed in the page with various free space holes surrounding them. Box 1611 depicts what the page would look like while being held in the XBM cache after it was compressed. The header 1603 exists at the beginning of the page as before. The two data rows 1605 and 1607 have been moved to follow right behind the header which basically eliminates the rest of the page which is how XBM performs the compression. In this case it will take less amount of space than it had originally. When the page is subsequently returned to DB2 to satisfy the request, the page is reformatted so that DB2 knows how to work with it and has been optimized for the free space as mentioned earlier. Box 1613 depicts what this page would look like. The header, box 1603, is again at the beginning of the page. The two data rows 1605 and 1607 follow immediately after the header. The remainder of the page to the trailer box 1609 that always resides at the end of the page has become DB2 free space and can be used for adding future data at a later time.

It will be noted that the DB2 free space compression algorithm works in conjunction with the standard DB2 compression procedure of using the DB2 edit procedure for row level compression. It does not preclude the use of that procedure nor require the use of it, but enhances that procedure also.

One significant advantage of the method just described is that it permits caching in the MVS environment independent of the access method protocol used to initiate an I/O request (e.g., QSAM, VSAM, Media Manager). In addition, objects can be user-prioritized for residence in the cache.

What is claimed is:

1. In a computer system having a processor, processor memory, and at least one secondary storage subsystem, a method operating within said processor of controlling a DB2 updating process in combination with a sequential READ process that backs up or copies an MVS data set stored on said secondary storage subsystem, said method comprising:

(a) performing the following operations one or more times:
   (1) intercepting within said processor a current update command signal from said DB2 updating process, said update command signal signifying that a specified portion of said MVS data set is to be updated with data referred to as an overwrite data portion; and
   (2) if an image of said specified portion referred to as a cached preimage does not exist in a cache stored in said processor memory, determined by checking the cache itself, caching in said processor memory an image of said specified portion as it exists on said secondary storage subsystem prior to updating said secondary storage subsystem with said overwrite data portion, (b) performing the following operations one or more times in parallel with the operations recited in paragraph (a):
   (1) intercepting within said processor a READ request from said READ process, said READ request signifying that said specified portion of said data set is to be copied to a buffer to create a buffered data portion; and
   (2) determining whether said buffered data portion corresponds to a cached preimage already existing in said processor memory by checking the cache itself and if so, then overwriting said buffered data portion with said cached preimage otherwise copying overwriting said buffered data portion with an image of the data portion as it exists on said secondary storage subsystem.

2. A program storage device readable by the processor of claim 1 and encoding a program of instructions for performing the operations recited in said specified claim.

* * * * *